Oct. 13, 1942.   M. STERN   2,299,043
METHOD OF TREATING LIGHT METAL SCRAP
Filed Oct. 27, 1941
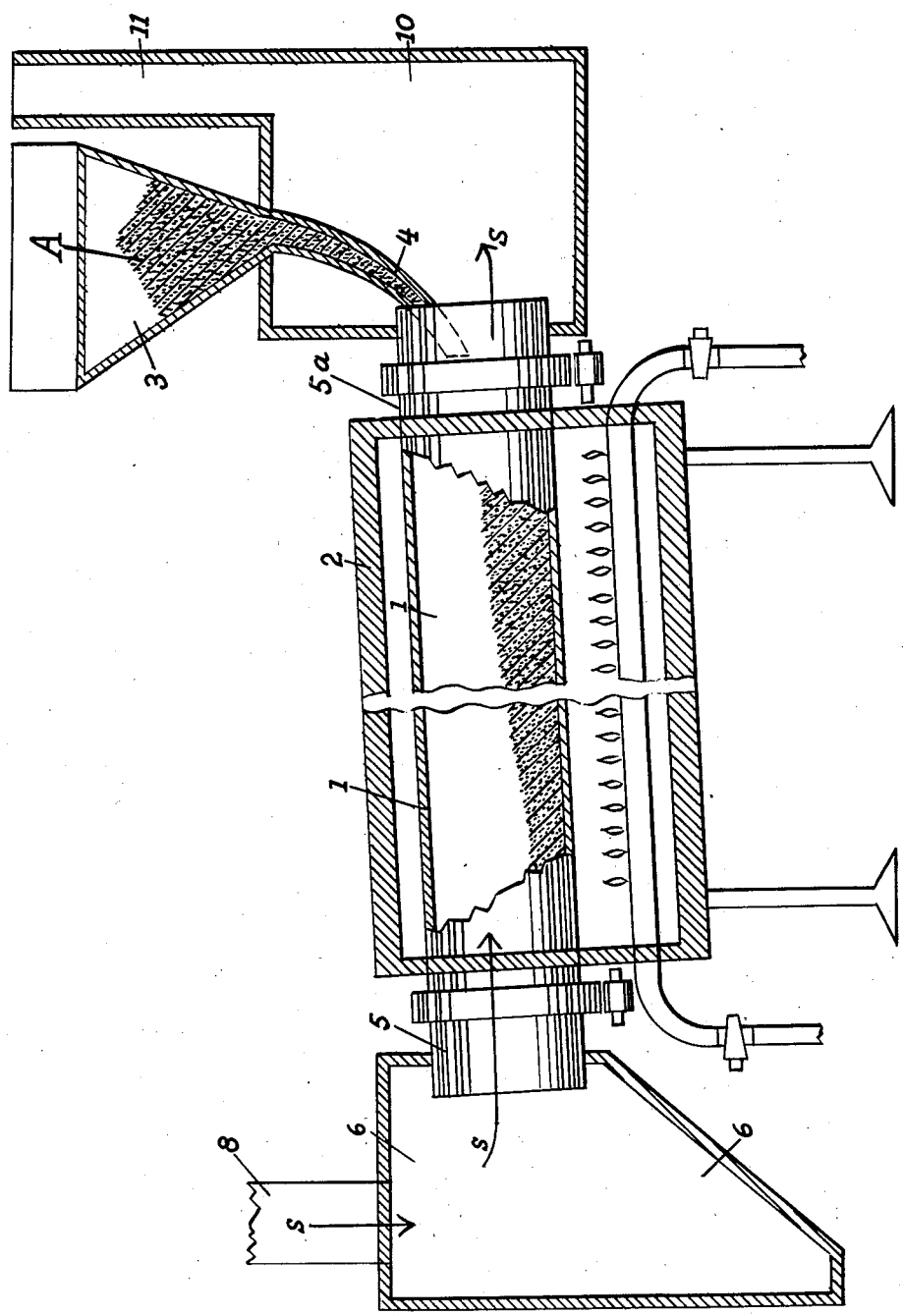
INVENTOR.
Max Stern
E. J. Freeman
BY
Attorney Patented Oct. 13, 1942

2,299,043

UNITED STATES PATENT OFFICE 2,299,043

METHOD OF TREATING LIGHT METAL SCRAP

Max Stern, New York, N. Y., assignor to Alloys Recovery Company Inc., Essex County, N. J.

Application October 27, 1941, Serial No. 416,677

2 Claims. (Cl. 75—67)

The invention relates to a method of treating light metal scrap and particularly magnesium scrap such as magnesium borings, turnings and chippings.

The treatment of this type of scrap and its conversion into compact metal is a problem of highest economical and technical importance. This problem becomes vital under circumstances where the supply of the virgin metal is urgently required for public purposes and the manufacturing capacities do not conform with the prevailing needs.

One of the greatest difficulties in the transformation of magnesium scrap into compact metal is caused by the contents in the scrap of certain impurities and particularly oil.

In the machining and in the shaping of magnesium metal by machine tools, grinding and similar devices great quantities of oil are used which mostly due to surface tension very firmly adhere to the scrap particles. This oil must be completely removed before the compacting of the metal can be undertaken, or else the intersecting oil films prohibit a perfect unit and coalescence of the scrap particles into homogeneous metal bodies.

Furthermore, the danger of ignition of the magnesium scrap is very greatly increased by the presence of oil which is sometimes present at a rate of up to 35% of the weight of the scrap.

It is generally known that particularly finely divided magnesium turnings and chippings when moist with cutting oil present a very serious hazard; when ignited such wet scrap burns with extreme violence and if confined in a melting pot or drum will develop enough pressure to spray the burning material over a large area and give rise to serious damages and burnings.

It is known to remove the oil from noninflammable metal scrap for instance steel and brass scrap by heating the same directly to compartively high temperatures whereby the oil is eliminated by evaporation and combustion.

It is also known to free the metal scrap from its oil contents by subjecting the latter to a dissolving action of certain organic solvents, for instance carbontetrachloride, trichlorethylene and similar substances.

The installations needed for the performance of these oil extracting processes are expensive and complicated if a complete oil removal is to be obtained; also they are not suitable for the efficient treatment of large scrap quantities. Furthermore, certain chemicals are needed for the operation of the extracting plants the supply of which may not be easy at all times.

Experiments made by the inventor have proven that the known methods and devices of liberating metal scrap from the machining oil are not usable for a deoiling treatment of magnesium scrap.

It would, of course, be suicidal to heat the magnesium scrap to the temperatures above referred to without at the same time taking very elaborate precautionary measures such as elimination of air or application of reducing gases to avoid ignition. However, hereby this type of oil removal is not adequate in practical large scale work.

On the other hand, in applying the known oil extracting measures to magnesium scrap the inventor has found that a residual percentage of the oil of approximately up to 8% cannot be removed at all.

The above outlined drawbacks are satisfactorily removed by the present invention.

It is therefore the main object of this invention to completely eliminate the oil contents of light metal scrap and particularly magnesium scrap.

It is a further object of the invention to achieve this oil liberation in a simple, highly effective, inexpensive and expeditious manner.

A further object of the invention is to completely avoid during the removal of the oil from the scrap the danger of inflammation and ignition without the application of the customary precautionary measures.

It is also an object of the invention to treat the magnesium scrap in such a manner that a satisfactory union and coalescence of the individual scrap particles is assured and homogeneous compact magnesium bodies are obtained having essentially the specific weight and the other particularly the casting properties of the virgin metal.

As previously referred to the oil contents of the magnesium scrap is exceedingly high which is mostly due to the large surface area of the scrap particles in comparison to their weight. The oil content of magnesium scrap produced in machine tool plants may go up to about 35-40%.

In order to eliminate this oil a method is employed in accordance with this invention which is based on the following principal steps.

The oil containing magnesium scrap is firstly subjected to a mechanical inexpensive scrap deoiling method, such as centrifuging, whereby the major percentage of the oil of up to about 90% is eliminated. The thus pretreated scrap is charged into an indirectly heated furnace preferably an inclined rotary kiln. The walls of the furnace contacted by the scrap are maintained at essentially the evaporation temperature of the different types of machining oil which lies between 150 and 250° C.

The major portion of the scrap particles, however, which is not in contact with the hot furnace walls must be continuously and directly cooled, for instance by an air stream which is forced through a zone of the kiln spaced from its bottom.

In this manner a continuous liberation of the oil is effected from the charged scrap, whereas an ignition is prevented by cooling the major portion of the same.

This method gains in importance insofar as the inventor has found that the ignition of the magnesium scrap is principally due to the combustion of easily inflammable particles such as oil soaked wood or paper pieces. By maintaining in the above recited manner a temperature in the furnace which is not much higher than about 200° C. the inflammation of these materials is prevented.

An installation which may be advantageously used for performing the present deoiling process is illustrated by way of example in the accompanying drawing.

The specific deoiling device is kiln 1 which is rotated in a customary manner within a combustion chamber 2 and indirectly heated from below.

The oil containing magnesium scrap A is continuously charged into funnel 3. The scrap sinks down in this funnel and is transported through tube 4 into the kiln.

The open end 5 of kiln 1 is encased in a discharging hopper 6. This hopper 6 is provided with an upper inlet tube 8.

The higher open end 5a of the kiln is encased by smoke chamber 10, leading to chimney 11.

The installation shown in the drawing is operated in the following manner.

The preheated oil containing scrap A is continuously charged into funnel 3. The scrap travels through the latter and through tube 4 and is introduced into the indirectly heated inclined rotary kiln 1.

The scrap in traveling through the kiln assumes due to its natural drop the shape indicated in the drawing its upper surface gradually slanting down towards the discharge end 5.

In this manner only that portion of the scrap directly contacting the heated kiln walls is heated. The air entering through aperture 8 is sucked in the direction of arrows S by the draft of the chimney through the kiln. Other pressure means may be used to force the air through the furnace. By the rotation of the kiln the heated magnesium scrap particles from which the oil is liberated during their comparatively short contact with the heated kiln wall are continuously lifted into the air stream. Due to their large surfaces and their good heat conductivity the scrap particles are quickly cooled. During their travel through the kiln they are repeatedly contacted with the hot kiln wall. In this manner the treatment is divided in small heating and long cooling periods. Nevertheless a complete removal of the oil is obtained and an ignition prevented. The liberated oil vapors are instantaneously transported from the furnace by the cool air stream entering through end 5 of the kiln.

The invention is described in the specification and in the drawing by way of example only and various changes and modifications may be made to the constructional details of the invention without departing from the broader spirit and scope thereof as set forth in the following claims.

I claim:

1. Method for the continuous treatment of oil containing magnesium scrap comprising charging the latter into an indirectly heated furnace, heating the furnace walls to a temperature substantially not exceeding the oil evaporating temperature, keeping the scrap in motion so as to prevent the continuous contact of the same portions of the charge with the furnace walls, contacting the lower portion of the scrap with the heated furnace wall and liberating the oil hereby, introducing into the furnace a cooling medium, cooling hereby the major upper portion of the scrap, simultaneously transporting the liberated oil from the furnace by means of said cooling medium and discharging the deoiled scrap from the furnace.

2. A method for the continuous treatment of oil containing magnesium scrap comprising removing from the latter about 90% of the oil, charging the partly deoiled scrap into an indirectly heated inclined rotary kiln, heating the kiln wall from below to a temperature substantially not exceeding the oil evaporating temperature, contacting the lower portion of the scrap with the heated kiln wall and liberating the oil hereby, introducing into the furnace a stream of cooling air, cooling the major upper portion of the scrap by the said air stream, transporting simultaneously the liberated oil by the said air stream from one end of the kiln and discharging the deoiled scrap from the other end of the same.

MAX STERN.